No. 869,494. PATENTED OCT. 29, 1907.
C. B. KING.
CHANGE SPEED GEAR.
APPLICATION FILED SEPT. 12, 1904. RENEWED MAR. 30, 1907.
6 SHEETS—SHEET 2.
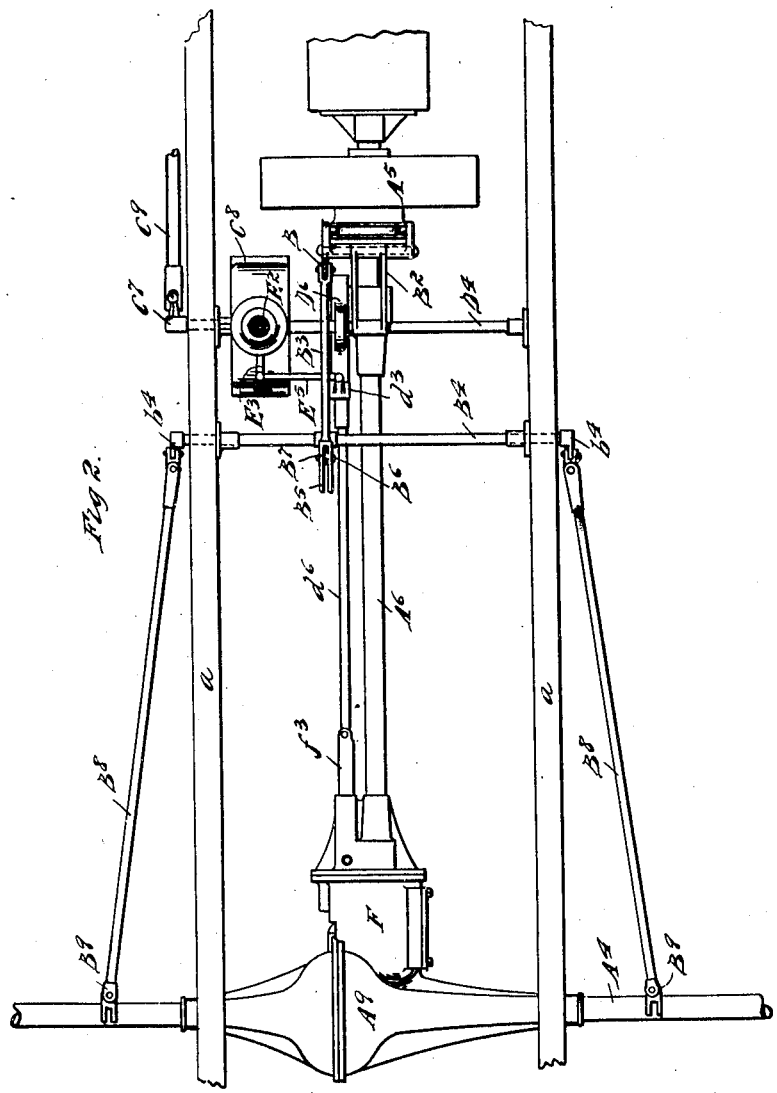

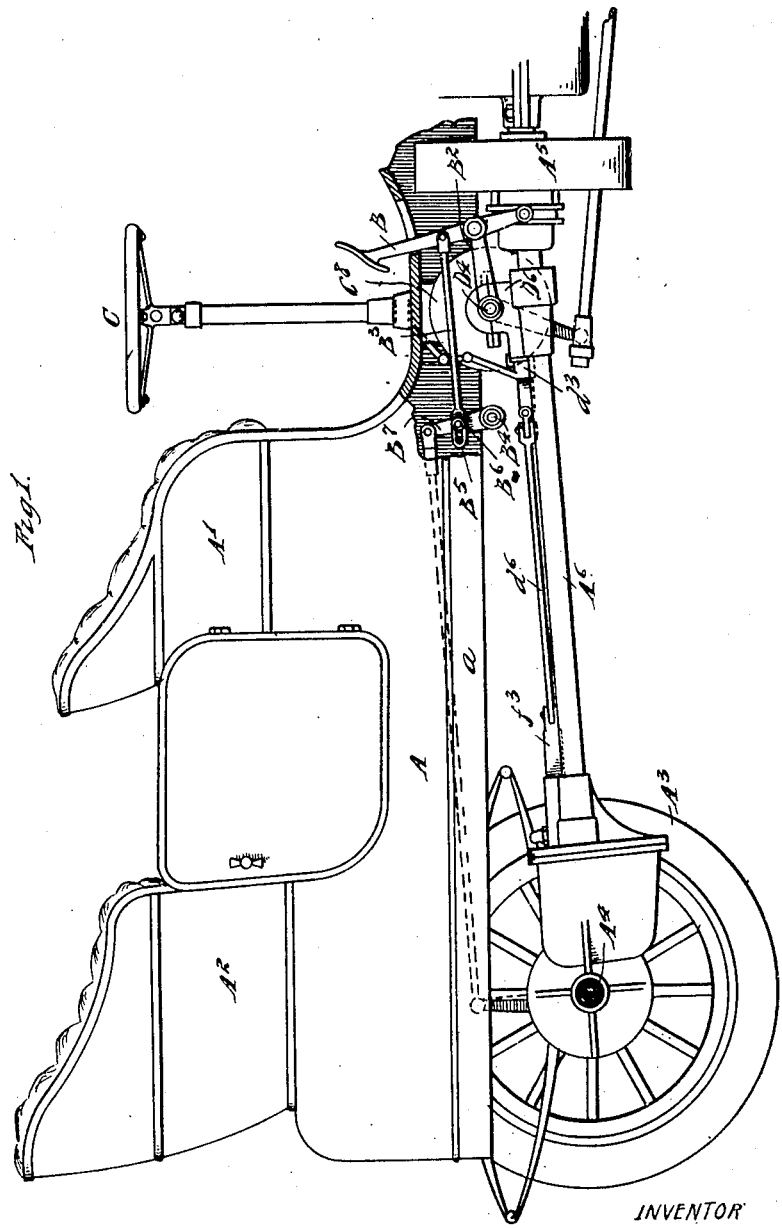

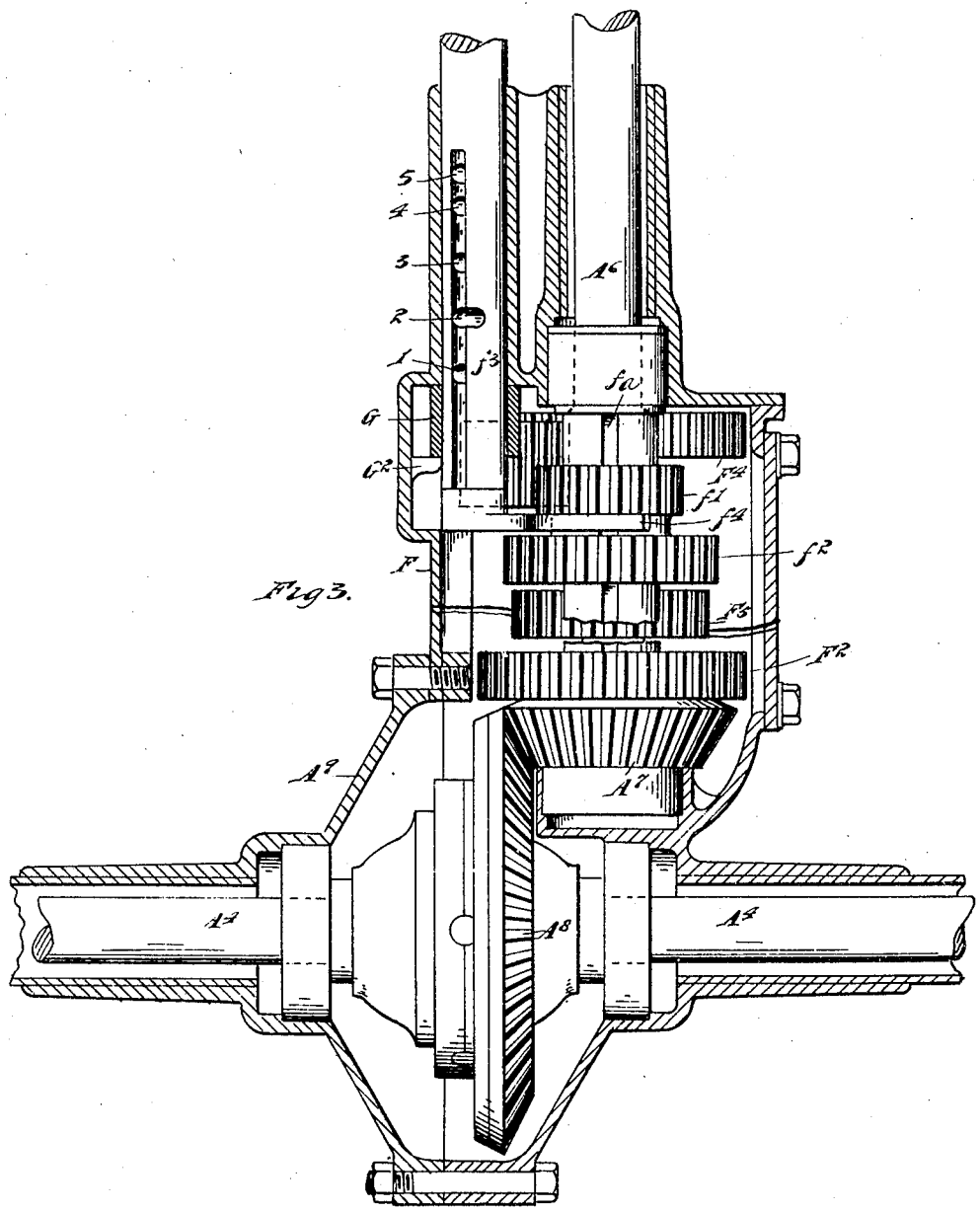

No. 869,494.
PATENTED OCT. 29, 1907.
C. B. KING.
CHANGE SPEED GEAR.
APPLICATION FILED SEPT. 12, 1904. RENEWED MAR. 30, 1907.
6 SHEETS—SHEET 4.
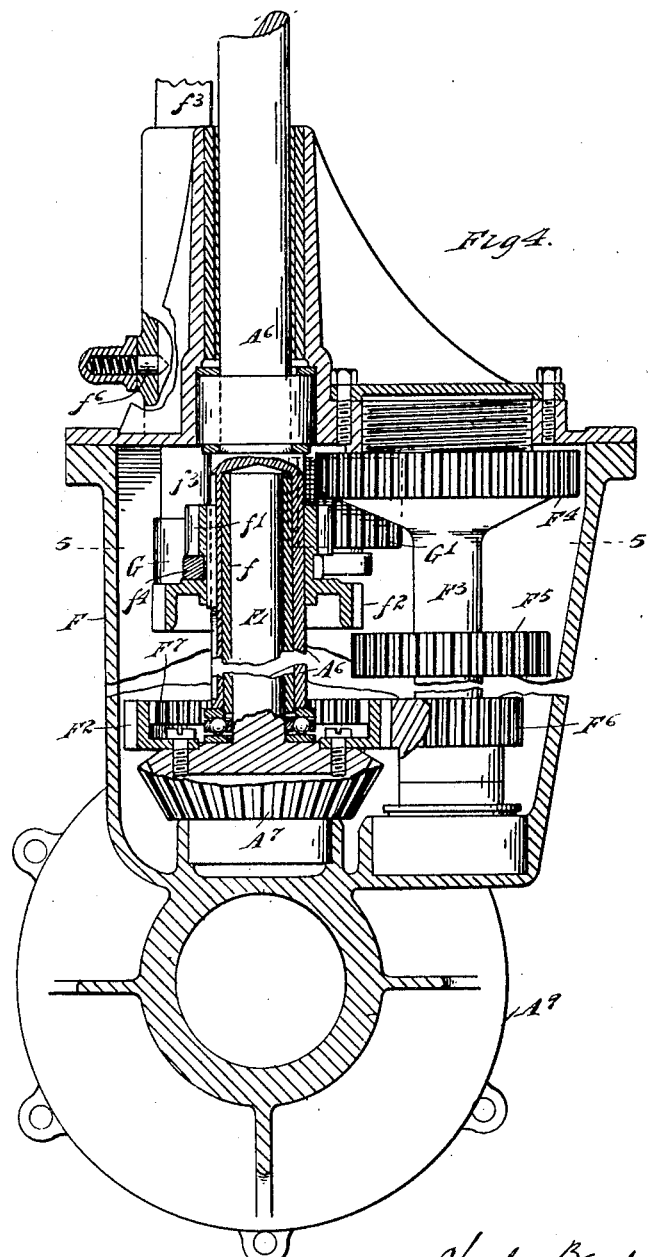
WITNESSES.
J. Y. Massey
C. F. Day
INVENTOR
Charles Brady King
by Parker & Burton
ATTORNEYS No. 869,494. PATENTED OCT. 29, 1907.
C. B. KING.
CHANGE SPEED GEAR.
APPLICATION FILED SEPT. 12, 1904. RENEWED MAR. 30, 1907.
6 SHEETS—SHEET 5.
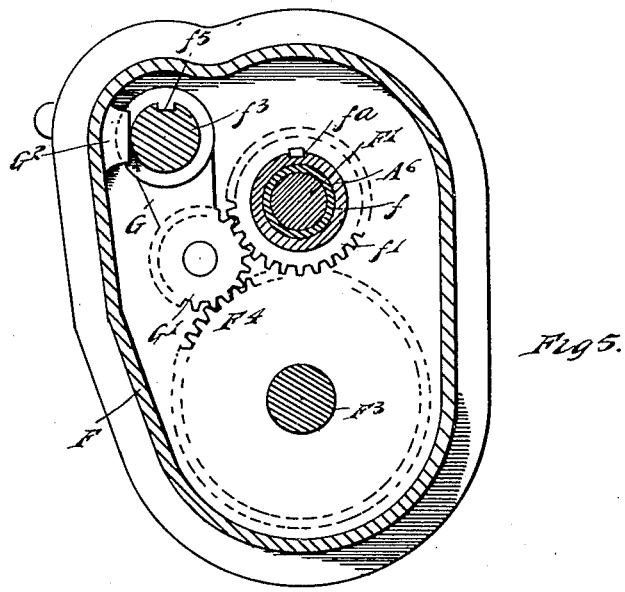
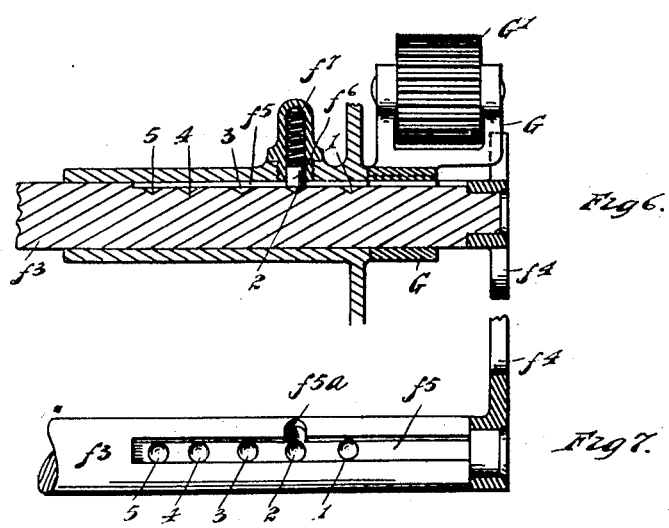
WITNESSES
INVENTOR
Charles Brady King
by Parker & Burton
ATTORNEYS.

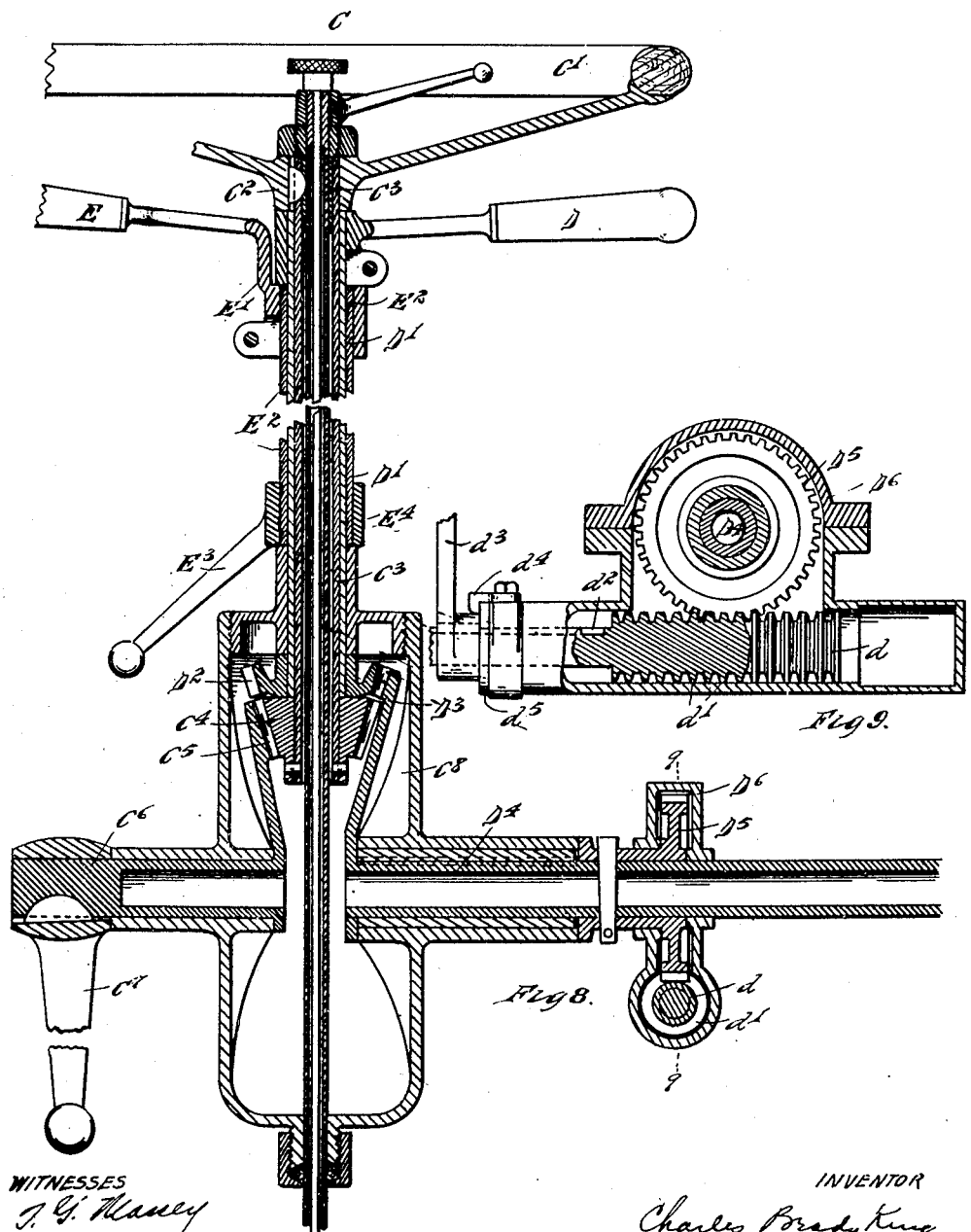

UNITED STATES PATENT OFFICE.

CHARLES BRADY KING, OF DETROIT, MICHIGAN.

CHANGE-SPEED GEAR.

No. 869,494.  Specification of Letters Patent.  Patented Oct. 29, 1907.

Application filed September 12, 1904. Serial No. 224,057. Renewed March 30, 1907. Serial No. 365,601.

*To all whom it may concern:*

Be it known that I, CHARLES BRADY KING, a citizen of the United States, residing at Detroit, county of Wayne, State of Michigan, have invented a certain new and useful Improvement in Change-Speed Gears, and declare the following to be a full, clear, and exact description of the same, such as will enable others skilled in the art to which it pertains to make and use the same, reference being had to the accompanying drawings, which form a part of this specification.

My invention relates to steering and controlling mechanism for automobiles, and the object of my improvements is to provide an improved mechanism for changing the speed, steering and reversing an automobile.

In the drawings:—Figure 1, is a side elevation of an automobile embodying my invention, the front wheels and parts adjacent thereto being omitted. Fig. 2, is a plan view of a portion of the frame with the apparatus embodying my invention secured in place thereon. Fig. 3, is a horizontal section of the casing of the equalizing gear and the casing of the change speed gear showing the contained parts in plan. Fig. 4, is a vertical section of the change speed gear case, part of the contained mechanism being also shown in section. Fig. 5, is a section on the line 5—5 of Fig. 4. Fig. 6, is a detail view showing the shifting rod and the guiding sleeve therefor in section. Fig. 7, is a plan view of the shifting rod looking down upon it in the position shown in Fig. 6. Fig. 8, is a section of the steering post including also the apparatus for operating the steering gear, the change speed gear and the reversing gear. Fig. 9, is a detail view principally in section on the line 9—9 of Fig. 8.

A, is the body of an automobile; $a$, $a$, are the side pieces of the frame; $A^1$, is the front seat and $A^2$, the back seat.

$A^3$, is a rear driving wheel; $A^4$, the rear axle; $A^5$, the fly-wheel; $A^6$, the transmission shaft; $A^7$, the beveled gear wheel through which motion is transmitted to the beveled gear wheel $A^8$ of the equalizing gear.

B, is a lever pivoted to the free end of a floating lever arm $B^2$. The lever B is provided at its upper end with a pedal to be operated by the driver and adapted at its lower end to operate the clutches between the power and the driving shaft $A^6$.

$B^3$, is a connecting rod pivoted at one end to the lever B above the arm $B^2$. The connecting rod $B^3$ is provided at its other end with the yoke $B^5$ inclosing an elongated slot through which slot passes a pin $B^6$ into an arm $B^7$ secured to and adapted to rotate the shaft $B^4$. Upon the ends of the shaft $B^4$ are lever arms $b^4$, $b^4$, to the free ends of which are pivoted the connecting rods $B^8$, $B^8$, which connect at $B^9$, $B^9$, with the brake mechanism.

The operation of the above described device is as follows:—The operator presses the upper end of the lever B forward disconnecting the clutch mechanism $B^1$, which may be done without actuating the brake, inasmuch as the slot in the yoke $B^5$ affords lost motion for this purpose. A further forward movement of the pedal upon the lever B actuates the brakes and stops the vehicle. I have designated collectively the mechanism adjacent to the steering sleeve by the reference letter C, and will call it the steering post.

The steering post C consists principally of three concentric sleeves, the outer one actuating the reversing mechanism; the next, the change speed gear and the inner one the steering gear. Specifically $C^1$, is the steering wheel, the hub $C^2$ of which is secured to the upper end of a sleeve $C^3$. The lower end of said sleeve extends into the casing $C^8$.

$C^4$, is a beveled gear wheel secured upon the lower end of the sleeve $C^3$ and meshing with a sector, or toothed arc, $C^5$ of a beveled gear wheel which is secured upon a shaft $C^6$ within the casing $C^8$. Upon the other end of the shaft $C^6$ is the arm $C^7$, which is connected in the usual way by a connecting rod $C^9$, with the steering mechanism, not shown.

D, is a handle normally extending laterally to the vehicle and clamped or otherwise secured to the upper end of a sleeve $D^1$ surrounding the sleeve $C^3$ and extending downward into the casing $C^8$.

$D^2$, is a beveled gear wheel, within the casing $C^8$, secured to the lower end of the sleeve $D^1$ and meshing with the teeth of the sector or toothed arc $D^3$ of a beveled gear wheel upon one end of a shaft $D^4$. The shaft $D^4$ at its other end rests in a bearing upon one of the side pieces $a$ of the frame.

$D^5$, is a spur gear wheel upon the shaft $D^4$, inclosed within the casing $D^6$.

$d$, is a rod adapted to slide longitudinally in ways in the casing $D^6$, and to rotate in said ways. Intermediate of its ends, the rod $d$ is provided with gear teeth $d^1$ which preferably extend around said rod. The gear teeth $d^1$ mesh with the gear teeth of the spur gear teeth $D^5$, as shown most distinctly in Fig. 9. The engagement of the teeth $d^1$ with the teeth of the spur gear wheel $D^5$, is such as to permit of a rotation of the rod $d$.

$d^2$, is a longitudinally extending slot cut in the rod $d$.

$d^3$, is a lever arm surrounding the rod $d$ and having a key extending into the groove or slot $d^2$.

$d^5$, is an annular projection around the hub of the lever arm $d^3$.

$d^4$, is a hook secured to the casing $D^6$ and extending over and engaging the lug $d^5$ so that the lever arm $d^3$ may turn relative to the casing $D^6$, but may not move in the direction of the length of the rod $d$.

The outer end of the rod $d$ is connected by a connecting rod $d^6$ with the gear shifting rod $f^3$ (Fig. 2).

E, is a handle extending from the side of the gear post C opposite to the handle D and normally in a direction lateral to the vehicle and having its hub E¹ clamped or otherwise secured to a sleeve E², surrounding the sleeve D¹, and provided at its lower end with a lever arm E³, the hub E⁴ of which is secured fast to said sleeve.

E⁵, (Fig. 2) is a connecting rod pivoted at one end to the outer end of the lever arm E³ and at the other end to the outer end of the lever arm d³, so that when the handle E is turned, the lever arm d³ is actuated thereby, through the sleeve E², arm E³, and connecting rod E⁵, to rotate the rod d which is so connected to the gear shifting rod f³ that the latter will rotate with it. The annular form of the teeth d¹ permits of the rotation of the rod d, without effecting their engagement with the teeth of the spur gear wheel D¹.

F, is the casing of the change speed gear.

F¹, is a stub shaft bearing into a cylindrical aperture formed at the end of the driving shaft A⁶, revoluble independently of said shaft and having formed thereon, or rigidly secured thereto, the beveled gear wheel A⁷.

F², is a spur gear wheel secured to the beveled gear wheel A⁷ and having exterior spur gear teeth and interior spur gear teeth indicated by the reference letter F⁷ in Fig. 4.

F³, is a counter shaft extending parallel to the shaft A⁶ within the gear casing F and revoluble in bearings in said casing.

F⁴, is a spur gear wheel upon the shaft F³ at one end of said shaft. F⁶, is a smaller spur gear wheel upon the shaft F³, at the other end thereof, the teeth of which mesh with the exterior teeth of the spur gear wheel F².

F⁵, is a spur gear wheel upon the shaft F³ intermediate in size and position between the spur gear wheels F⁴ and F⁶.

f, is a sleeve within the casing F, adapted to slide longitudinally upon the shaft A⁶ and provided with a key extending into a key way $f^a$ (Fig. 3), or groove upon the shaft A⁶, so that said sleeve is restrained from angular movement relative to said shaft.

f¹, is a spur gear wheel upon the sleeve f adapted to engage with the spur gear wheel F⁴ when the sleeve F is moved into a position that brings said spur gear wheels opposite each other.

f², is a spur gear wheel, upon the sleeve f, of such a diameter that it will engage with the spur gear wheel F⁵ when the sleeve f is moved to a position bringing said spur gear wheels opposite each other. The teeth of the spur gear wheel f² are also adapted to engage the interior gear teeth F⁷ of the spur gear wheel F² when the sleeve f is pushed to that end of its travel.

G, is a lever arm surrounding, at one end, the rod f³ and having a key extending into a longitudinal key way, or slot, in said rod so that said rod may move longitudinally with reference to said swinging arm, but any rotation of said rod will turn said lever arm. The hub of said lever arm abuts against the end of the gear case F at one side and against a lug G² (Fig. 3) at the other side, so that a linear movement of said swinging arm relative to the gear case F is restrained.

The rod f³ is provided with a key way above spoken of, extending for a considerable distance longitudinally thereto and is adapted to slide longitudinally in a sleeve extending from the casing F. One end of said rod being within the casing F and the other extending outside thereof.

1, 2, 3, 4, and 5, (Figs. 6 and 7) are depressions drilled at intervals into the bottom of the key way f⁵ in the rod f³.

f⁵ᵃ, is a groove branching at right angles to the groove or key way f⁵ opposite the depression 2 and communicating with the latter.

f⁶, is a pin pressed inward by the spring f⁷ and extending into the groove or key way f⁵ in the rod f³. The pin f⁶ enters the depressions 1, 2, 3, 4 and 5, and by the friction caused thereby marks the different positions of the gear shifting rod f³. Said pin prevents the rotation of the rod f³ relative to the gear casing F, except at the position marked by the depression 2 at which position the rod f³, may be rotated carrying the pin f⁶ into the groove f⁵ᵃ.

The operation of the above described device is as follows:—The wheel C¹ (Fig. 8) is rotated carrying with it, the beveled gear wheel C⁴, actuating the sector C⁵, the shaft C⁶, and arm C⁷, and turning the steering wheels through the connecting rod C⁹ and the usual mechanism, not shown. The handle D is turned carrying with it the beveled gear wheel D², sector D³, shaft D⁴, spur gear wheel D⁵, which actuates through the teeth d¹, the rod d which carries with it through the connecting rod d⁶, the gear shifting rod f³. The rod f³ carries with it the sleeve f by means of a fork f⁴ upon the inner end of the rod f³ engaging the sleeve f. When the handle D is so moved as to draw the rod d and with it the rod f³ to the end of the travel toward the front of the vehicle, the sleeve f is moved so as to engage the spur gear wheel f¹ with the spur gear wheel F⁴, so that the shaft A⁶ actuates the counter shaft F³ through said spur gear wheels and the beveled spur gear wheel A⁷ through the spur gear wheels F⁶ and F², thus giving the slow motion ahead. When the handle D is so moved as to carry the rod f³ to the position in which the pin f⁶ engages in the depression 2, the sleeve f is entirely disengaged from the shaft F³, and the shaft A⁶ may rotate without moving the vehicle. The pin f⁶ is then opposite the slot or groove f⁵ᵃ. If, now, the handle E is turned, it will turn the rod d through the arms E³, d³, and the turning of the rod d will turn the rod f³, bringing the pin f⁶ into the slot f⁵ᵃ, and turning the swinging arm G so as to engage the wheel G¹ with the spur gear wheels f¹ and F⁴. The revolutions of the shaft A⁶ will then communicate and reverse the movement of the beveled gear wheel A⁷ and drive the vehicle backward. If now, the handle E is moved to its first position, the pin f⁶ is brought back into the groove or key way f⁵ and the wheel G¹ is disengaged from the wheels f¹ and F⁴, and the shaft A⁶ is again free to turn without actuating the rest of the mechanism. If now, the handle D is turned further, it will move the rods d and f³ further; the rod f³ carrying with it the sleeve f and causing the spur gear wheel f² to engage with the spur gear wheel F⁵, thus securing the intermediate speed ahead. When the rod f³ is moved still further, the spur gear wheel f² disengages from the spur gear wheel F⁵ and engages directly with the interior teeth F⁷ of the spur gear wheel F², thus binding the shaft A⁶ directly to the shaft F¹ and communicating the fast speed ahead to the vehicle.

Inasmuch as a slight angular rotation of the rods d and f³ is sufficient to adjust the reverse gearing, any arrangement and construction of the intermeshing gear teeth that will permit of relative lateral movement may obviously be employed without departing from my invention.

What I claim is:—

1. A part adapted to have a linear and an angular movement, in combination with other parts constituting together a speed change gear, said movable part being arranged to connect the parts of the mechanism for the different speeds in one direction by a linear movement, and for a speed in the other direction by its angular movement.

2. The combination of the gearing of a change speed gear, a rod adapted to slide longitudinally to shift the change speed gear, and to turn to throw in the reverse gear, and means for shifting and turning said rod.

3. In a change speed gear, the combination of parts adapted to engage to form the different speeds and to disengage, by a lineal movement of one of said parts, means adapted to engage said parts by an angular movement and a part adapted to have both a lineal and angular movement and to actuate the movable part lineally by its lineal movement, and to actuate the angularly movable means for engaging the parts, by its angular movement.

4. The combination of a driving shaft, a counter shaft and a driven shaft, gear wheels connecting the counter shaft with one of the other shafts, a plurality of gear wheels of different diameters upon the counter shaft, a plurality of gear wheels of different diameters upon the shaft that is not geared to the counter shaft, one of said plurality of gear wheels being sleeved upon its shaft and adapted to move longitudinally thereof to engage different gear wheels to produce the different speeds, a rod adapted to slide in a way in the direction of the motion of said sleeve, an arm upon said rod revoluble but restrained from longitudinal motion with reference thereto and engaging said sleeve, an arm upon said rod a gear wheel at the free end of said arm, said rod being adapted to slide through the last mentioned arm, but restrained from angular movement relative thereto, said rod being adapted to have a longitudinal and a rotary motion, for the purpose described.

5. The combination of a driving shaft, a counter shaft and a driven shaft, gear wheels connecting the counter shaft with one of the other shafts, a plurality of gear wheels of different diameters upon the counter shaft, a plurality of gear wheels of different diameters upon the shaft that is not geared to the counter shaft, one of said plurality of gear wheels being sleeved upon its shaft and adapted to move longitudinally thereof to engage different gear wheels to produce the different speeds, a rod adapted to slide in a way in the direction of the motion of said sleeve, an arm upon said rod revoluble but restrained from longitudinal motion with reference thereto and engaging said sleeve, an arm upon said rod a gear wheel at the free end of said arm, said rod being adapted to slide through the last mentioned arm, but restrained from angular movement relative thereto, said rod being provided with a longitudinal groove and with a groove extending laterally therefrom intermediate its ends and a pin adapted to extend into said grooves.

6. In a change speed gear, a rod adapted to slide longitudinally and to rotate in ways, said rod being provided with gear teeth along its length, said gear teeth extending approximately in an arc of a circle, a gear wheel adapted to turn in fixed bearings and having its teeth meshing with the teeth upon said rod, a longitudinally extending groove in said rod, an arm upon said rod having a key extending into said groove, and means for restraining the lineal movement of said arm without constraining its angular movement.

7. In a change speed gearing, a rod adapted to slide longitudinally and to rotate, in ways, said rod being provided with gear teeth along its length, a gear wheel adapted to turn in fixed bearings and having its teeth meshing with the teeth upon said rod, the intermeshing teeth being adapted to have a relative lateral movement, an arm upon said rod restrained from angular movement relative thereto, and means for adjusting the angular position of said arm.

8. In a change speed gear, a rod adapted to slide longitudinally and to rotate, in ways, said rod being provided with gear teeth along its length, a gear wheel having its teeth meshing with the teeth upon said rod, the intermeshing teeth being adapted to have a relative lateral movement, an arm upon said rod restrained from angular movement relative thereto, means for restraining the lineal movement of said arm without constraining its angular movement, a connecting rod pivoted to the end of said arm, and a fixed pivoted lever arm having its free end connected to the other end of said connected rod.

In testimony whereof, I sign this specification in the presence of two witnesses.

CHARLES BRADY KING.

Witnesses:
THOMAS G. MASSEY,
LOTTA LEE HAYTON.